(12) United States Patent
Shreemal et al.

(10) Patent No.: US 10,963,849 B2
(45) Date of Patent: Mar. 30, 2021

(54) METHOD AND SYSTEM FOR FACILITATING A CASHLESS TRANSACTION

(71) Applicant: MASTERCARD INTERNATIONAL INCORPORATED, Purchase, NY (US)

(72) Inventors: Ankit Shreemal, Haryana (IN); Suneel Bhatt, Delhi (IN); Avyaktanand Tiwary, Haryana (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 209 days.

(21) Appl. No.: 15/808,529

(22) Filed: Nov. 9, 2017

(65) Prior Publication Data
US 2018/0137485 A1 May 17, 2018

(30) Foreign Application Priority Data
Nov. 17, 2016 (SG) .......................... 10201609649R (51) Int. Cl.
*G06Q 20/10* (2012.01)
*G06Q 20/32* (2012.01)
(Continued)

(52) U.S. Cl.
CPC ......... *G06Q 20/102* (2013.01); *G06Q 20/204* (2013.01); *G06Q 20/3223* (2013.01);
(Continued)

(58) Field of Classification Search
CPC ...... G06Q 20/12; G06Q 20/20; G06Q 20/322; G06Q 20/40; G06Q 20/102; G06Q 20/32;
(Continued)

(56) References Cited

U.S. PATENT DOCUMENTS 5,644,118 A   7/1997   Hayashida
5,692,132 A   11/1997  Hogan
(Continued)

FOREIGN PATENT DOCUMENTS

WO      2013028910 A2    2/2013

OTHER PUBLICATIONS

PCT International Search Report and Written Opinion, Application No. PCT/US2017/055723, dated Jan. 8, 2018, 13 pps.

*Primary Examiner* — Alexander G Kalinowski
*Assistant Examiner* — Sanjeev Malhotra
(74) *Attorney, Agent, or Firm* — Armstrong Teasdale LLP (57) ABSTRACT

The present disclosure provides a computer-implemented method for facilitating a cashless transaction between a merchant and a customer, a system implementing the method, and a non-transitory computer-readable medium storing computer-readable instructions that, when executed, cause a processor to perform steps of the method. The method includes receiving, from an electronic device of the merchant, a transaction message including merchant identification data, customer identification data, and data on cost of the transaction, retrieving, from a merchant database, a profile of the merchant identified by the merchant identification data, communicating a payment message to a mobile device of the customer identified by the customer identification data, receiving, from the online payment interface accessible by the customer mobile device via the address link, authorization of the transaction by the customer and details of a customer payment vehicle, and transferring the transaction cost from the customer payment vehicle to the merchant financial account.

20 Claims, 5 Drawing Sheets

(51) Int. Cl.
*G06Q 30/06* (2012.01)
*G06Q 20/20* (2012.01)

(52) U.S. Cl.
CPC ......... *G06Q 20/3255* (2013.01); *G06Q 30/06* (2013.01); *G06Q 30/0641* (2013.01)

(58) Field of Classification Search
CPC ...... G06Q 20/023; G06Q 20/04; G06Q 20/10; G06Q 20/405; G06Q 30/06; G06Q 40/025; G06Q 20/02; G06Q 20/108; G06Q 20/3224; G06Q 20/3227; G06Q 20/3276; G06Q 20/36; G06Q 20/385; G06Q 20/401; G06Q 30/02; G06Q 40/00; G06Q 40/02; G06Q 20/14; G06Q 20/3674; G06Q 20/382; G06Q 20/3821; G06Q 20/38215; G06Q 30/04; G06Q 40/12
USPC ........ 705/14.33, 14.53, 16, 17, 18, 21, 26.1, 705/26.8, 30, 38, 39, 40, 42, 44, 67, 75, 705/14.23, 2, 37; 235/380; 1/1; 707/802
See application file for complete search history.

(56) References Cited

U.S. PATENT DOCUMENTS

| | | | |
|---|---|---|---|
| 6,529,880 B1 | 3/2003 | McKeen et al. | |
| 8,275,664 B2 | 9/2012 | Ramsdale et al. | |
| 8,793,184 B2 | 7/2014 | Lakshminarayanan | |
| 2002/0103752 A1* | 8/2002 | Berger | G06Q 20/10 705/39 |
| 2002/0152123 A1* | 10/2002 | Giordano | G06Q 20/322 705/14.33 |
| 2005/0209883 A1* | 9/2005 | Fletcher-Haynes | G16H 40/20 705/2 |
| 2006/0144925 A1* | 7/2006 | Jones | G06Q 20/40 235/380 |
| 2006/0178986 A1* | 8/2006 | Giordano | G06Q 20/20 705/40 |
| 2007/0255653 A1 | 11/2007 | Tumminaro et al. | |
| 2009/0157555 A1* | 6/2009 | Biffle | G06Q 20/40 705/67 |
| 2009/0228336 A1* | 9/2009 | Giordano | G06Q 20/202 705/75 |
| 2010/0010930 A1* | 1/2010 | Allen | G06Q 40/00 705/38 |
| 2010/0106611 A1* | 4/2010 | Paulsen | G06Q 20/102 705/26.1 |
| 2010/0223146 A1 | 9/2010 | Entenmann | |
| 2010/0276484 A1 | 11/2010 | Banerjee et al. | |
| 2012/0011065 A1* | 1/2012 | Winfield-Chislett | G06Q 20/227 705/42 |
| 2012/0136780 A1* | 5/2012 | El-Awady | G06Q 20/14 705/40 |
| 2012/0166279 A1* | 6/2012 | Collins | G06Q 30/0255 705/14.53 |
| 2012/0179558 A1* | 7/2012 | Fischer | G06Q 20/20 705/16 |
| 2012/0191556 A1* | 7/2012 | Forbes | G06O 20/3674 705/17 |
| 2012/0271768 A1* | 10/2012 | Kang | G06O 20/425 705/44 |
| 2013/0246203 A1* | 9/2013 | Laracey | G06Q 20/401 705/21 |
| 2013/0275296 A1* | 10/2013 | Tietzen | G06Q 50/26 705/39 |
| 2013/0290187 A1* | 10/2013 | Itwaru | G06Q 20/20 705/44 |
| 2014/0012689 A1* | 1/2014 | Henderson | G06Q 20/327 705/18 |
| 2014/0046843 A1 | 2/2014 | Liscia | |
| 2014/0074705 A1* | 3/2014 | Kimberg | G06Q 20/10 705/42 |
| 2014/0222616 A1* | 8/2014 | Siemiatkowski | G06Q 20/40 705/26.8 |
| 2015/0019593 A1* | 1/2015 | Kaufman | G06F 16/951 707/802 |
| 2015/0032615 A1* | 1/2015 | Blackhurst | G06Q 20/108 705/42 |
| 2015/0032623 A1* | 1/2015 | Friedman | G06Q 20/12 705/44 |
| 2015/0039502 A1* | 2/2015 | Blackhurst | G06Q 10/0838 705/42 |
| 2015/0046331 A1 | 2/2015 | Gupta et al. | |
| 2015/0142544 A1* | 5/2015 | Tietzen | G06Q 20/3224 705/14.23 |
| 2015/0262310 A1 | 9/2015 | Howe | |
| 2016/0019657 A1* | 1/2016 | Mande | G06Q 40/12 705/30 |
| 2016/0034859 A1 | 2/2016 | Puroshottam et al. | |
| 2016/0063493 A1* | 3/2016 | Howe | G06Q 20/322 705/44 |
| 2016/0162999 A1* | 6/2016 | Johansen | G06Q 20/202 705/21 |
| 2016/0239824 A1* | 8/2016 | Klingen | G06Q 20/322 |
| 2016/0239837 A1* | 8/2016 | Klingen | G06Q 20/3227 |
| 2016/0328679 A1* | 11/2016 | Shutt | G06Q 10/10 |
| 2017/0004496 A1* | 1/2017 | Pujari | G06Q 20/3821 |
| 2017/0017958 A1* | 1/2017 | Scott | G06Q 20/3265 |
| 2017/0024951 A1* | 1/2017 | Nelson | G07F 17/3206 |
| 2017/0161735 A1* | 6/2017 | Ortiz | G06Q 20/385 |
| 2017/0286949 A1* | 10/2017 | Gurunathan | G06Q 20/407 |
| 2017/0330285 A1* | 11/2017 | Ehrhart | G06Q 40/04 |
| 2018/0005229 A1* | 1/2018 | Grassadonia | G06Q 20/3221 |
| 2018/0025424 A1* | 1/2018 | Babcock | G06Q 40/04 705/37 |
| 2018/0089661 A1* | 3/2018 | Itwaru | G06Q 20/3276 |
| 2018/0137484 A1* | 5/2018 | Laracey | G06Q 20/20 |
| 2018/0253727 A1* | 9/2018 | Ortiz | G06Q 20/325 |
| 2018/0293573 A1* | 10/2018 | Ortiz | G06Q 20/3821 |
| 2018/0300722 A1* | 10/2018 | Matthews | G06Q 20/20 |
| 2018/0330346 A1* | 11/2018 | Grassadonia | G06Q 20/10 |

* cited by examiner

METHOD AND SYSTEM FOR FACILITATING A CASHLESS TRANSACTION

CROSS REFERENCE TO RELATED APPLICATIONS

This patent application claims priority to Singapore Application No. 10201609649R filed on Nov. 17, 2016, the disclosure of which is incorporated by reference herein in its entirety as part of the present application.

BACKGROUND

The present disclosure generally relates to a method and system for facilitating a cashless transaction. More particularly, the present disclosure describes various embodiments of a method and system for facilitating a cashless transaction between a merchant and a customer, e.g. for purchasing products from the merchant.

In developed countries, transactions between merchants and customers are increasingly being performed using cashless payment modes in place of conventional cash. Cashless payment modes include payment cards such as credit/debit cards, or a digital wallet linked to a customer's financial account. The customer may also link a mobile phone to his/her financial accounts, e.g. bank account or credit card, and use the mobile phone to pay for transactions at a merchant via wireless communications protocols such as Near Field Communication (NFC). The mobile phone has a hardware module or an NFC component, and the merchant has a corresponding NFC reader at the merchant billing machine. Transactions can be completed and paid for simply by waving the mobile phone in front of the NFC reader. Cashless transactions are quicker and more convenient, and arguably more secure compared to using cash.

However, in less developed or developing countries or regions, cash remains a preferred payment mode for both merchants and customers. Many of them may prefer to have the money to hand instead of seeing funds being digitally transferred, as would be in the case of cashless transactions. There have been efforts in implementing cashless and mobile transaction systems for the merchants in these countries, but the adoption of these systems is low, especially by the smaller merchants. Smaller merchants may not understand the technology behind mobile transaction systems, such as NFC, and would not be keen to adopt such systems at their shops. They may only have common cash register terminals at their shops for storing cash and perhaps make simple records of sales transactions. The cost of upgrading to a more advanced NFC-enabled merchant billing machine may discourage the merchants from doing so. Operating such machines would require stable and reliable infrastructure for internet connectivity, which may be lacking in remote towns. It can thus be a liability for smaller merchants to implement cashless and mobile transaction systems at their shops.

Some parts of Africa have adopted a mobile phone-based money transfer system known as M-Pesa. M-Pesa allows users to deposit, withdraw, transfer money, and pay for transactions with a mobile phone, without the use of cash. However, users have to open an account and deposit money into their accounts first before they can make any transaction. Both merchants and customers are required to open accounts which may discourage some from using M-Pesa. Especially for travelers or tourists, they may not be interested in using M-Pesa because of the troublesome process in opening accounts and making deposits with cash. Thus, M-Pesa is not an entirely cashless transaction system as cash is still required to make deposits in order to use M-Pesa as a payment mode.

Therefore, in order to address or alleviate at least one of the aforementioned problems and/or disadvantages, there is a need to provide a method and system for facilitating a cashless transaction between a merchant and a customer, in which there is at least one improved feature over the prior art.

BRIEF DESCRIPTION

An aspect of the present disclosure provides a computer-implemented method for facilitating a cashless transaction between a merchant and a customer, a system implementing the method, and a non-transitory computer-readable medium storing computer-readable instructions that, when executed, cause a processor to perform steps of the method. The method includes receiving, from an electronic device of the merchant, a transaction message including merchant identification data, customer identification data, and data on cost of the transaction, retrieving, from a merchant database, a profile of the merchant identified by the merchant identification data, the merchant profile including details of a financial account of the merchant, communicating a payment message to a mobile device of the customer identified by the customer identification data, the payment message including an address link to an online payment interface, receiving, from the online payment interface accessible by the customer mobile device via the address link, authorization of the transaction by the customer and details of a customer payment vehicle, and transferring the transaction cost from the customer payment vehicle to the merchant financial account.

An advantage of the present disclosure is that the merchant can make use of existing equipment, e.g. a merchant electronic device in the form of a mobile phone, to perform and facilitate cashless transactions with customers. Customers can pay for purchases at the merchant without using cash, but instead rely on mobile and cashless payment vehicles or modes such as credit/debit cards. Merchants may not be interested or knowledgeable with the latest payment/financial technologies, and the present disclosure provides a simple way for merchants to implement mobile and cashless payment modes for their customers.

A method and system for facilitating a cashless transaction between a merchant and a customer according to the present disclosure is thus disclosed herein. Various features, aspects, and advantages of the present disclosure will become more apparent from the following detailed description of the embodiments of the present disclosure, by way of non-limiting examples only, along with the accompanying drawings.

DETAILED DESCRIPTION

In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated. The recitation of a particular numerical value or value range herein is understood to include or be a recitation of an approximate numerical value or value range.

For purposes of brevity and clarity, descriptions of representative or exemplary embodiments of the present disclosure are directed to a method and system for facilitating a cashless transaction between a merchant and a customer, in accordance with the drawings in FIG. 1 to FIG. 6. While aspects of the present disclosure will be described in conjunction with the embodiments provided herein, it will be understood that they are not intended to limit the present disclosure to these embodiments. On the contrary, the present disclosure is intended to cover alternatives, modifications, and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, well-known systems, methods, procedures, and components have not been described in detail so as to not unnecessarily obscure aspects of the embodiments of the present disclosure.

Figure 1:
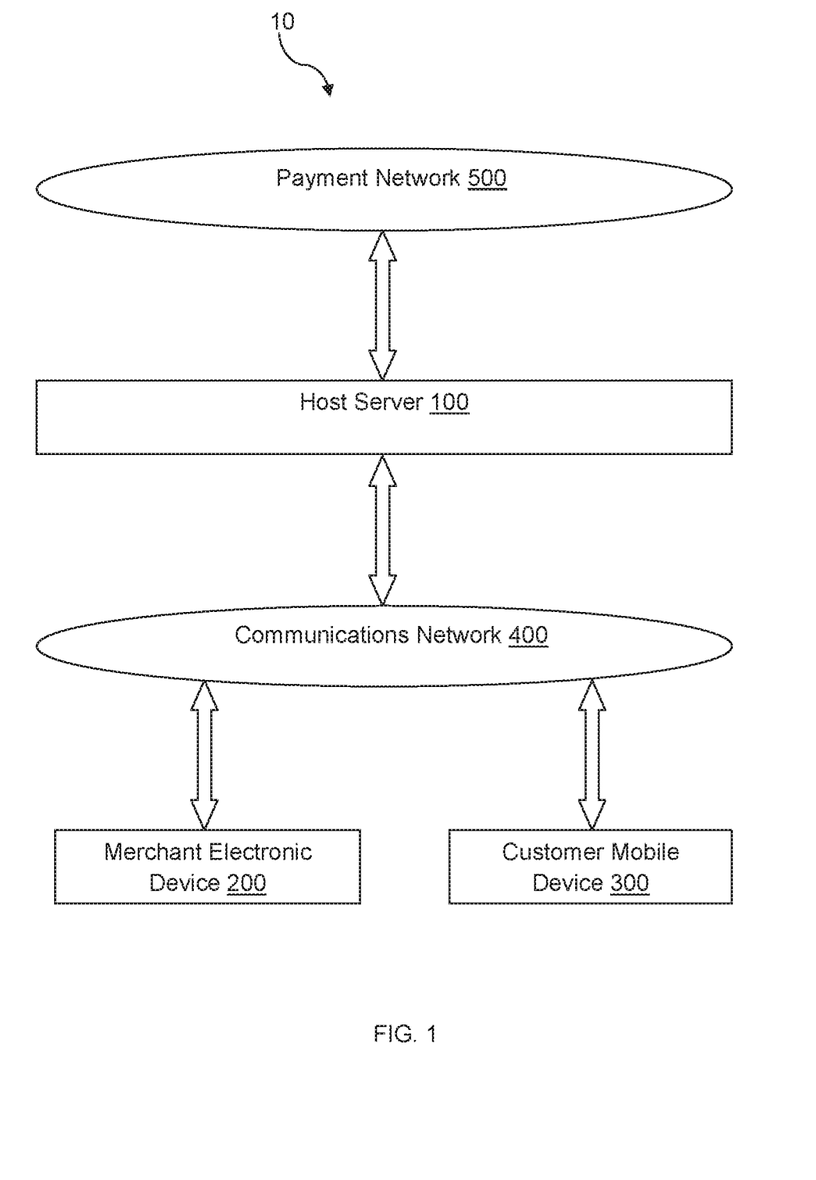
FIG. 1 is an illustration of a system for implementation of a method for facilitating a cashless transaction between a merchant and a customer, in accordance with embodiments of the present disclosure.

In exemplary embodiments of the present disclosure, there is a system 10 for facilitating a cashless transaction between a merchant and a customer, as illustrated in FIG. 1. The system 10 includes a host server 100 having a processor and a memory configured to store computer-readable instructions for executing a method for facilitating the cashless transaction according to embodiments of the present disclosure. The system 10 includes an electronic device 200 of the merchant which is communicable with the host server 100. The system 10 further includes a mobile device 300 of the customer which is communicable with the host server 100. The customer mobile device 300 may be or include mobile phones, smartphones, personal digital assistants (PDAs), tablets, laptops, and/or computers. The merchant electronic device 200 may be a mobile device similar to the customer mobile device 300, or may alternatively be a computing device, e.g. Point of Sale (POS) terminal, PC, or laptop, that is disposed at a retail shop or store (retail premises) of the merchant. In various embodiments, the merchant electronic device 200 is a mobile device such as a mobile phone.

The system 10 may further include a communications network 400 communicatively linked to the host server 100 for facilitating data communication with the merchant electronic device 200 and customer mobile device 300. Data communication at the merchant electronic device 200 and customer mobile device 300 may occur via the communications network 400 in cooperation with telecommunications service providers which the merchant and customer subscribe to for performing communications operations with the merchant electronic device 200 and customer mobile device 300, respectively. Alternatively, data communication may occur directly with the host server 100, such as if the host server 100 has its own system of communication protocols.

The system 10 may further include a payment network 500 communicatively linked to the host server 100. The payment network 500 links together financial institutions (e.g. banks and credit card institutions) associated with financial/bank accounts of the merchant and with payment cards (e.g. credit cards) or other payment vehicles of the customer. The term "payment vehicle" may refer to any suitable cashless payment mechanism, such as a credit card, a debit card, a prepaid card, a charge card, a membership card, a promotional card, a frequent flyer card, an identification card, a gift card, and/or any other payment cards that may hold payment card information (e.g. details of user account or payment card) and which may be stored electronically on the customer mobile device 300. The payment network 500 is operative for processing payment from a payment vehicle of the customer to a financial or bank account of the merchant.

Figure 2:
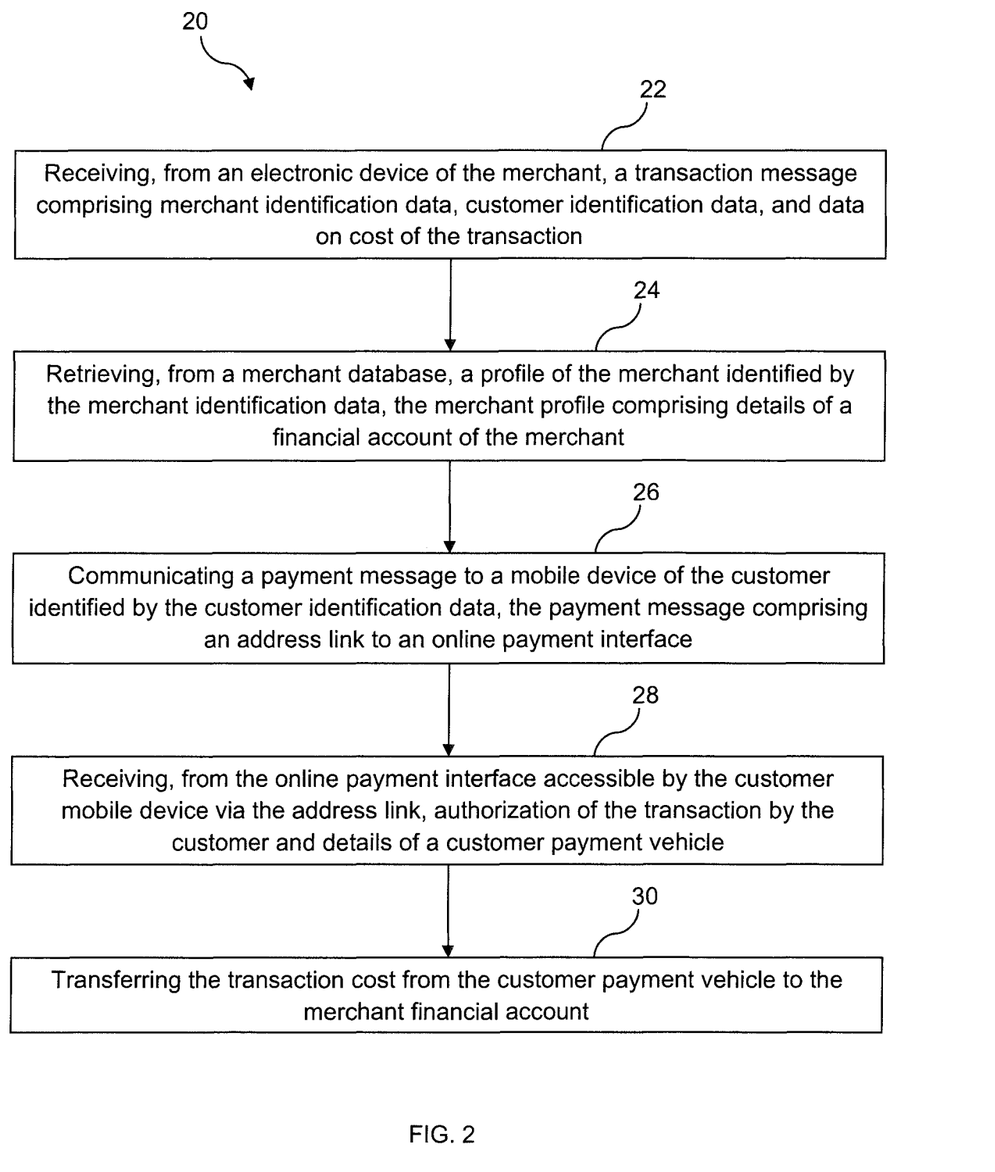
FIG. 2 is a flowchart illustration of a method for facilitating a cashless transaction between a merchant and a customer, in accordance with embodiments of the present disclosure.

With reference to FIG. 2, there is a computer-implemented or computerized method 20, i.e. implemented on a computer such as the host server 100, for facilitating a cashless transaction between the merchant and the customer. When the customer goes to the merchant retail premises and intends to purchase a product or service, instead of using cash to make the purchase, the merchant may propose the method 20 to the customer so that the customer may complete the transaction without cash, i.e. a cashless transaction.

Broadly, in various embodiments of the present disclosure as shown in FIG. 2, the method 20 for facilitating a cashless transaction includes the following steps:

a. a step 22 of receiving, from an electronic device 200 of the merchant, a transaction message including merchant identification data, customer identification data, and data on cost of the transaction;

b. a step 24 of retrieving, from a merchant database, a profile of the merchant identified by the merchant identification data, the merchant profile including details of a financial account of the merchant;

c. a step 26 of communicating a payment message to a mobile device of the customer identified by the customer identification data, the payment message including an address link to an online payment interface;

d. a step 28 of receiving, from the online payment interface accessible by the customer mobile device via the address link, authorization of the transaction by the customer and details of a customer payment vehicle; and e. a step 30 of transferring the transaction cost from the customer payment vehicle to the merchant financial account.

Figure 3:
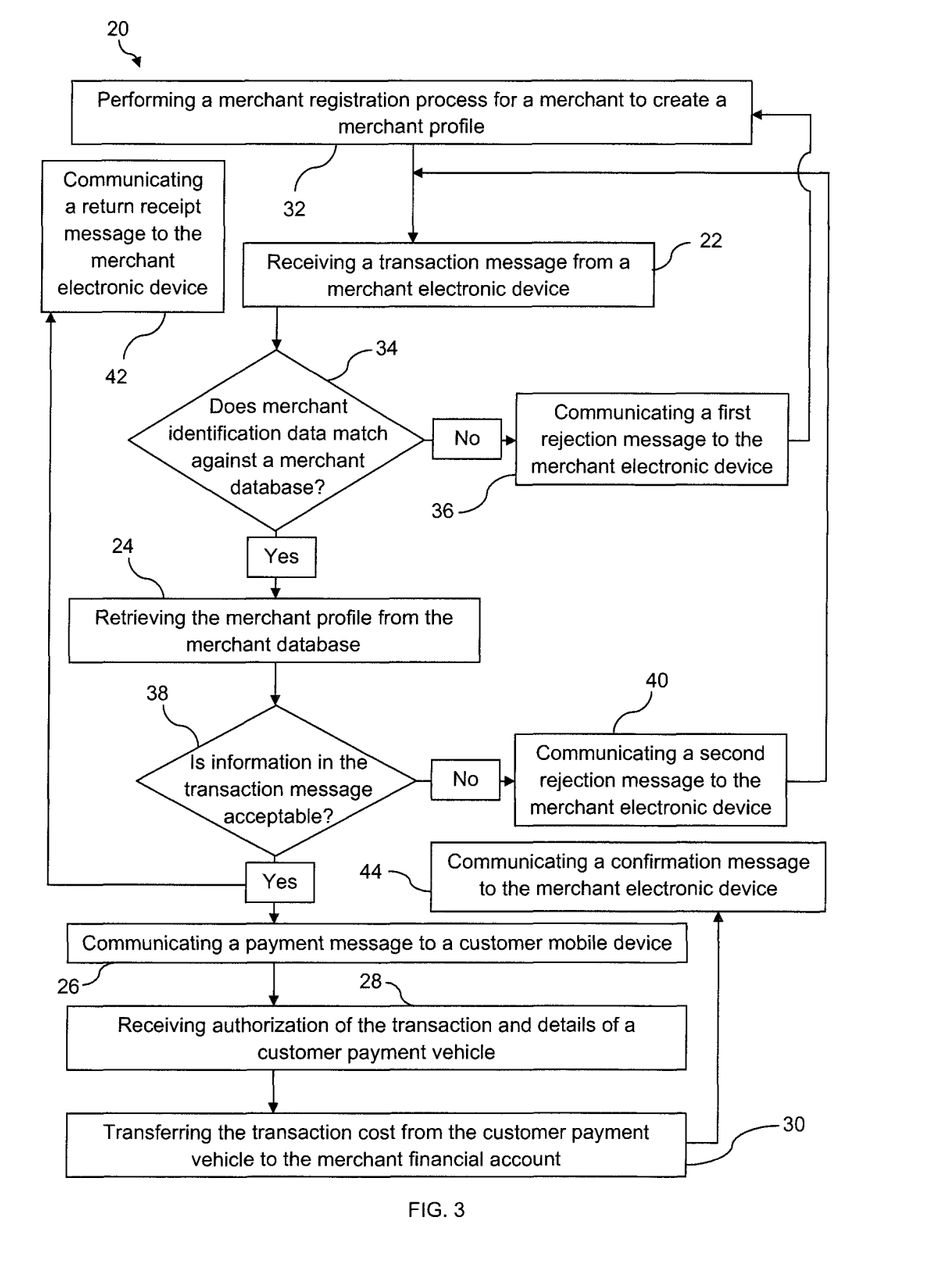
FIG. 3 is a more detailed flowchart illustration of the method of FIG. 2, in accordance with one embodiment of the present disclosure.

An exemplary embodiment of the present disclosure is described hereafter, with reference to FIG. 3.

The method 20 may include a step 32 of performing a merchant registration process for the merchant to create a merchant profile. Particularly, in order to use the method 20, the merchant may be first required to create or register the merchant profile or account through the merchant registration process. The merchant may register the merchant profile through the phone, e.g. by calling a dedicated phone number, or through agents/salespersons who are assigned to promote the use of the method 20 to merchants, particularly the smaller or micro merchants. During the merchant registration process, the merchant is required to provide merchant details including the phone number associated with the merchant electronic device 200, and financial details of the merchant (e.g. financial/bank account details) for receiving payment from customers. The merchant profile is stored on the merchant database, along with other merchant profiles of other merchants. The phone number of the merchant electronic device 200 serves as merchant identification data to distinguish the merchant profile from other merchant profiles within the merchant database. Alternatively, the merchant identification data may be or include a unique username or account number associated with the merchant profile. Accordingly, each merchant profile is uniquely identifiable by the merchant identification data, which may include the phone number of the merchant electronic device 200, and/or username/account number associated with the merchant profile. The merchant database may reside on the host server 100, or alternatively on a remote computer communicatively linked to the host server 100.

The merchant may propose to the customer the method 20 for facilitating a cashless transaction, and if the customer accepts, the customer would be required to provide his/her phone number to the merchant. Specifically, the customer phone number is associated with the customer mobile device 300 which he/she is carrying at the time of purchase at the merchant retail premises. In relation to the step 22, the merchant, using the merchant electronic device 200, communicates the transaction message to a dedicated recipient number. The communication may occur via known mobile communications protocols or signals such as short message service (SMS) through the communications network 400. In other words, the merchant electronic device 200 may be communicable via SMS. SMS operates under the global system for mobile communications (GSM) standards for traditional communication networks, which may form part of the communication network 400 of the system 10. The merchant, having subscribed to a telecommunications service provider, would be able to send and receive SMS through services provided by the telecommunications service provider. Although SMS is a relatively conventional communication mode, it is often used in less developed or developing countries where internet connectivity is not as commonplace as in developed countries. The transmission and receiving of SMS does not require internet connectivity at the merchant retail premises. Thus, the merchant does not need to spend additional money to upgrade the merchant billing machines and/or to subscribe to internet service providers for the merchant retail premises.

However, if the merchant retail premises already have the necessary infrastructure for internet connectivity, the merchant may still use the method 20 for facilitating cashless transactions if the merchant does not intend to upgrade the merchant billing machines to more advanced systems, e.g. with NFC-enabled readers. Similarly, if the merchant electronic device 200 may have internet connectivity provided thereto, such as if the locality of the merchant has the necessary infrastructure for high-speed communications within the communications network 400, e.g. via 3G, 4G, or long term evolution (LTE). The merchant electronic device 200 would thus be able to communicate data via the internet instead of or in addition to the traditional SMS texts. Accordingly, the merchant electronic device 200 may be communicable via internet-based messaging.

The dedicated recipient number represents a registered mobile system and an operator has to register the dedicated recipient number for use on the communications network 400. The dedicated recipient number may be a phone number, a representative number for receiving internet-based messaging, or an SMS short code or short number, e.g. "12345". The dedicated recipient number may be provided by a telecommunications service provider to the operator, which may be part of or associated with the host server 100. The host server 100 is thus associated with the dedicated recipient number such that the host server 100 is able to receive the transaction message sent by the merchant through the communications network 400.

Accordingly, in the step 22, the host server 100 receives the transaction message communicated from the merchant electronic device 200. The transaction message includes merchant identification data, e.g. the phone number of the merchant electronic device 200, because metadata of the transaction message would indicate the merchant phone number as the sender. The transaction message further includes customer identification data and data on cost of the transaction. The customer identification data may include the phone number of the customer mobile device 300 which was informed to the merchant by the customer. The customer phone number may include the country code and area code, where applicable, so as to differentiate local customers from foreign tourists. Alternatively or additionally, the customer identification data may include an email address of the customer. The transaction cost data include a numerical value of the transaction cost, i.e. the cost of the product which the customer intends to purchase. The currency of the transaction cost would be determined based on the country of the merchant as identified by the merchant identification data.

As an example, a tourist from Singapore (customer) is on a holiday in another country and visits the retail premises of a merchant. The customer intends to purchase a souvenir that costs 5000 rupees. To facilitate a cashless transaction using the method 20, the merchant sends a transaction message from the merchant electronic device 200 via SMS to the dedicated recipient number, e.g. "12345". The transaction message would read "6512345678 5000". "6512345678" represents the customer identification data which in this example is the phone number of the mobile device 300 of the customer, including the country code (65) of Singapore. The customer identification data may, additionally or alternatively, include the customer's email address, e.g. xxx@yyy.com. The transaction message would thus read "xxx@yyy.com 5000", or "6512345678 xxx@yyy.com 5000". In the transaction message, "5000" represents the transaction cost data. The metadata of the transaction message includes the merchant phone number for identifying the merchant, and may additionally include the date and time of transmission of the transaction message. It would be appreciated that the format of the transaction message may be varied as required, such as based on predefined instructions from the host server 100 and/or operator of the dedicated recipient number.

After receiving the transaction message in the step 22, the host server 100 processes the transaction message prior to retrieving the merchant profile from the merchant database. The merchant profile is identified by the merchant identification data including the merchant phone number contained in the metadata of the transaction message. The method 20 may further include a step 34 of matching the merchant identification data against the merchant database. If the merchant identification data matches a merchant profile in the merchant database, the method 20 may proceed to the step 24 for retrieving the merchant profile. Conversely, if the merchant identification data does not match any merchant profile in the merchant database, the host server 100 may, in a step 36 of the method 20, communicate a first rejection message to the merchant electronic device 200. The first rejection message informs the merchant that his/her merchant profile does not exist on the merchant database, and may further include information about the merchant registration process in the step 32, which the merchant may later consider.

In the step 24, the host server 100 retrieves the merchant profile from the merchant database. The merchant profile is identified by the merchant identification data including the merchant phone number. The merchant profile includes details of a financial account of the merchant, which were provided by the merchant during the merchant registration process in the step 32. The financial account details may include the merchant bank name, bank account number, branch code, etc. to enable the merchant to securely receive funds after processing by the payment network 500.

The method 20 may further include a step 38 of assessing whether the transaction message contains the necessary information in the correct format. For example, the step 38 assesses whether the customer identification data contains a valid phone number and/or email address. If the assessment is positive and the information in the transaction message is acceptable, the method 20 may proceed to the step 26. Conversely, if the assessment is negative and the information in the transaction message is not acceptable, the host server 100 may, in a step 40 of the method 20, communicate a second rejection message to the merchant electronic device 200. The second rejection message informs the merchant about the error(s) in the transaction message, e.g. lack of information and/or incorrect format presentation, and may request the merchant to re-write and re-send the transaction message, i.e. repeat the step 22.

If the steps 34 and 38 do not produce any problems or issues, the method 20 may proceed to a step 42 of communicating a return receipt message to the merchant electronic device 200. The step 42 may occur simultaneously with the step 26, or one occurring immediately after the other. The return receipt message is communicated subsequent to the host server receiving the transaction message from the merchant electronic device 200. More specifically, the return receipt message is communicated after the host server 100 has completed the steps 34 and 38. In a way, the return receipt message informs the merchant that the transaction message has no problems or issues, i.e. the transaction message is acceptable, and the transaction is waiting for the customer to initiate and complete the payment process.

In the step 26 of the method 20, the host server 100 communicates a payment message via the communications network 400 to the customer mobile device 300 according to the customer identification data in the transaction message. The customer identification data may include the customer phone number and/or email address. The payment message may be sent by SMS or internet-based messaging to the customer phone number. The payment message may, alternatively or additionally, be sent as an email to the customer email address. The customer may open and read the payment message on his/her customer mobile device 300, such as with a message/email application. The payment message includes an address link (e.g. a Uniform Resource Locator or URL) to an online payment interface, e.g. a website or an online portal for the customer to make payment.

Upon receiving the payment message on the customer mobile device 300, the customer may use the customer mobile device 300 to access the online payment interface via the address link provided in the payment message. Notably, accessing the online payment interface requires internet connectivity on the customer mobile device 300. The merchant may not have the necessary infrastructure for internet connectivity at the merchant retail premises, and thus would not be able to provide Wi-Fi connectivity for the customer. As such, the customer would be expected to have already provided internet connectivity to his/her customer mobile device 300.

The online payment interface may include editable fields for the customer to input his/her details via the customer mobile device 300, particularly details of a customer payment vehicle (e.g. payment card or credit card). For example, if the customer payment vehicle is a credit card, these editable fields may include, but are not limited to:
1. Credit card number;
2. Customer name on credit card;
3. Card security code (CSC);
4. Expiry date;
5. Billing address;
6. Email address; and
7. Contact number.

The online payment interface may specify that the email address and/or contact number should be the same as that provided in the customer identification data. This may provide verification of the customer's identity when the payment is being processed.

Additionally, the online payment interface may include non-editable fields, i.e. information which the customer would be able to see but unable to edit. These non-editable fields may include, but are not limited to:
1. Transaction cost data;
2. Currency of transaction cost;
3. Current date and time; and
4. Merchant (payee) details, e.g. name and address of merchant;

The information in the non-editable fields informs the customer of the amount he/she is going to pay for the product he/she is purchasing from the merchant and that the merchant (payee) details are correct, i.e. the customer knows he/she is not paying to the wrong party.

The online payment interface may be auto-populated with the information in the non-editable fields, e.g. transaction cost data, in response to the customer mobile device 300 accessing the online payment interface. The information is derived or obtained from the transaction message received in the step 22. Accordingly, the online payment interface, as well as the address link pointing to the online payment interface, is unique to the instant transaction and is generated based on data and metadata contained in the transaction message.

In an alternative embodiment, instead of having the customer manually input the information for the editable fields on the online payment interface via the customer mobile device 300, the same information may be auto-populated on the online payment interface. The information, e.g. customer payment vehicle details, may be retrieved from a customer user account stored on a customer database, which also stores the customer user accounts of other customers. The customer database may reside on the host server 100, or alternatively on a remote computer communicatively linked to the host server 100.

The method 20 may include performing a customer registration process for a customer to create a customer user account. The customer user account allows the customer to frequently utilize the method 20 for facilitating cashless transactions without having to manually input customer payment vehicle details every time a transaction is being made with a merchant. Thus, in order to use the method 20, the customer may be first required to create or register the customer user account through the customer registration process. The customer may register the customer user account online, e.g. with a computer or the customer mobile device 300. During the customer registration process, the customer is required to provide customer details, such as the above-listed information for the editable fields in the online payment interface, and specifically the customer payment vehicle details. Customer login details may be associated with the customer user account. Customer login details (e.g. username and password) may be created by the customer or automatically generated during the customer registration process. Accordingly, each customer user account in the customer database is uniquely identifiable by the customer login details, particularly the usernames.

In this alternative embodiment, the information for the editable fields is retrieved from the customer user account and auto-populated on the online payment interface. The address link in the payment message received by the customer mobile device 300 in the step 26 may point to an intermediary interface that asks for the customer login details. The intermediary interface may provide an additional address link to the online payment interface for manual input of the information if the customer does not have a customer user account. The intermediary interface may also provide another link to the customer registration process for the customer to register a customer user account.

If the customer already has a customer user account, the customer login details may be inputted on the intermediary interface. The customer login details are matched against the customer database to retrieve the customer user account, and if there is a matched customer user account, the online payment interface would be displayed on the customer mobile device 300. The editable fields on the online payment interface would be auto-populated with the information extracted from the customer user account. Accordingly, subsequent to communicating the address link to the customer mobile device 300 and upon submission of the customer login details at the intermediary interface, the host server 100 receives the customer login details for retrieving the customer payment vehicle details from the customer user account.

Therefore, the customer payment vehicle details may be entered on the online payment interface manually by the customer, or automatically extracted from the customer user account. The customer proceeds to check that the information in all the fields in the online payment interface is correct and submits it for payment processing. The submission of the customer payment vehicle details includes an implicit authorization of the transaction between the customer and the merchant. As shown in FIG. 3, in the step 28 of the method 20, the host server 100 receives, from the online payment interface (accessible by the customer mobile device 300 via the address link), authorization of the transaction by the customer and details of a customer payment vehicle (e.g. credit card).

The host server 100 may subsequently communicate the customer payment vehicle details and the merchant financial account details to the payment network 500 to process the payment. During the payment process, there may be additional verification steps such as two-factor authentication (2FA) or one-time password (OTP). These additional verification steps may be required if the customer is purchasing a relatively expensive product, or if the transaction cost is higher than a threshold amount. This threshold amount may be predetermined by the customer, or a default amount set by the issuer bank of the customer's credit card.

After completion of the payment process by the payment network 500, the transaction cost would be transferred from the customer payment vehicle to the merchant financial account, as indicated in step 30 of the method 20. Based on the merchant financial account details obtained from the merchant profile, the funds for the transaction cost would be transferred to a designated financial or bank account of the merchant.

The customer may take the product he/she has purchased after completion of the payment process and the merchant has received the funds for the transaction cost, or the cost of the product. However, the merchant may not have real-time access to the merchant financial account and may not be able to timely check for receipt of the funds. As shown in FIG. 3, the method 20 may include a step 44 of communicating a confirmation message to the merchant electronic device 200 in response to completion of transfer of the transaction cost. The confirmation message informs and assures the merchant that the funds have been transferred to the merchant financial account, and that the merchant may proceed to complete the transaction with the customer.

Therefore, the method 20 allows the merchant to make use of existing equipment, e.g. the merchant electronic device 200 which may be a simple mobile device or mobile phone, to perform and facilitate cashless transactions with customers. Customers can pay for purchases at the merchant without using cash, but instead rely on mobile and cashless payment vehicles or modes such as credit/debit cards. Cashless payment modes may be more secure than cash as cash, even if kept under lock and key at the merchant retail premises may be vulnerable to theft and stolen.

For merchants, particularly the smaller or micro merchants, they may not be interested or knowledgeable with the latest payment/financial technologies, such as mobile payment via NFC devices. The method 20 provides a simple way for merchants to implement mobile and cashless payment modes for their customers. By having mobile and cashless payment modes, it is foreseeable that merchants can attract more customers to purchase from their retail premises. To use the method 20, it is also not necessary for the merchants to subscribe to internet service providers for the merchant retail premises, thereby alleviating them of the additional cost liability on subscription charges.

From the customers' perspective, they need not carry too much cash on them if they can pay for purchases using the method 20 with their desired payment vehicles (e.g. credit cards), even at the smaller or micro merchants. This can be advantageous to travelers or tourists as they may tend to carry a large amount of cash in the currency of their destination country. With the method 20, travelers/tourists can carry a smaller amount of cash, thereby mitigating or reducing monetary losses during unwanted incidents, e.g. robbery or pickpocketing.

Figure 4:
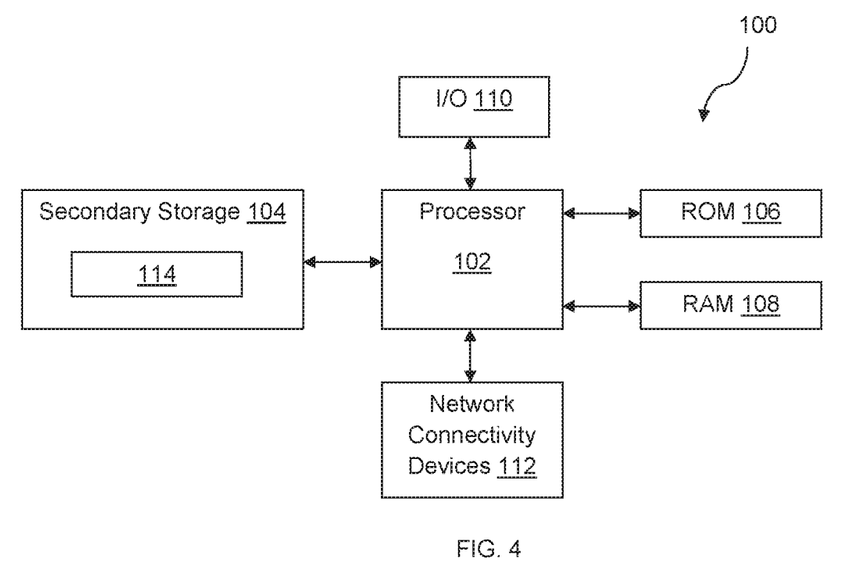
FIG. 4 is an illustration of a block diagram of the technical architecture of a host server, in accordance with embodiments of the present disclosure.
Figure 5:
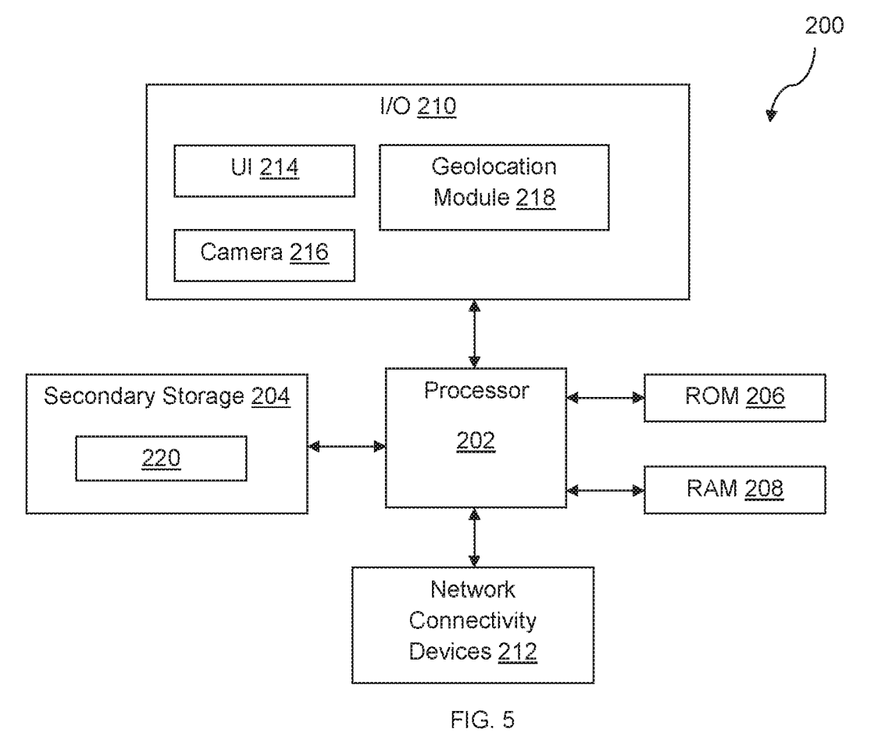
FIG. 5 is an illustration of a block diagram of the technical architecture of a merchant electronic device, in accordance with embodiments of the present disclosure.
Figure 6:
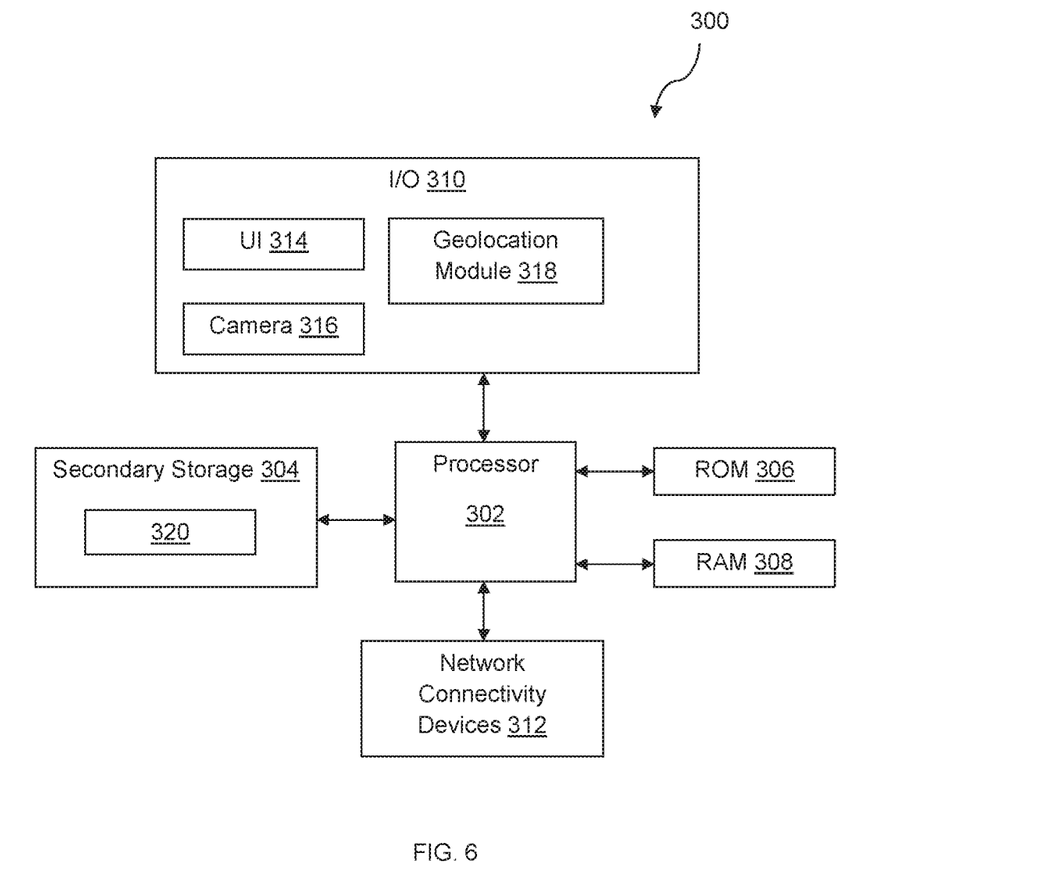
FIG. 6 is an illustration of a block diagram of the technical architecture of a customer mobile device, in accordance with embodiments of the present disclosure.

The following is a description of the technical architectures of the host server 100, merchant electronic device 200, and customer mobile device 300, according to embodiments of the present disclosure.

FIG. 4 illustrates a block diagram showing a technical architecture of the host server 100. The technical architecture of the host server 100 includes a processor 102 (which may be referred to as a central processor unit or CPU) that is in communication with memory devices including secondary storage 104 (such as disk drives or memory cards), read only memory (ROM) 106, and random access memory (RAM) 108. The processor 102 may be implemented as one or more CPU chips. The technical architecture further includes input/output (I/O) devices 110, and network connectivity devices 112.

The secondary storage 104 typically includes a memory card or other storage device and is used for non-volatile storage of data and as an over-flow data storage device if RAM 108 is not large enough to hold all working data. Secondary storage 104 may be used to store programs which are loaded into RAM 108 when such programs are selected for execution.

The secondary storage 104 has a processing component 114, including non-transitory instructions operative by the processor 102 to perform various operations of the method 20 according to various embodiments of the present disclosure. The ROM 106 is used to store instructions and perhaps data which are read during program execution. The secondary storage 104, the ROM 106, and/or the RAM 108 may be referred to in some contexts as computer-readable storage media and/or non-transitory computer-readable media. Non-transitory computer-readable media include all computer-readable media, with the sole exception being a transitory propagating signal per se.

The I/O devices 110 may include printers, video monitors, liquid crystal displays (LCDs), plasma displays, touch screen displays, keyboards, keypads, switches, dials, mice, track balls, voice recognizers, card readers, paper tape readers, and/or other well-known input devices.

The network connectivity devices 112 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 112 may enable the processor 102 to communicate with communication networks, e.g. the communication network 400, including the internet or one or more intranets. With such a network connection, it is contemplated that the processor 102 might receive information from the network, or might output information to the network in the course of performing the operations or steps of the method 20. Such information, which is often represented as a sequence of instructions to be executed using processor 102, may be received from and outputted to the network, for example, in the form of a computer data signal embodied in a carrier wave.

The processor 102 executes instructions, codes, computer programs, scripts which it accesses from hard disk, floppy disk, optical disk (these various disk based systems may all be considered secondary storage 104), flash drive, ROM 106, RAM 108, or the network connectivity devices 112. While only one processor 102 is shown, multiple processors may be present. Thus, while instructions may be discussed as executed by a processor, the instructions may be executed simultaneously, serially, or otherwise executed by one or multiple processors.

It should be appreciated that the technical architecture of the host server 100 may be formed by one computer, or multiple computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the multiple computers. In an embodiment, virtualization software may be employed by the technical architecture to provide the functionality of a number of servers that is not directly bound to the number of computers in the technical architecture. In an embodiment, the functionality disclosed above may be provided by executing the application and/or applications in a cloud computing environment. Cloud computing may include providing computing services via a network connection using dynamically scalable computing resources. A cloud computing environment may be established by an enterprise and/or may be hired on an as-needed basis from a third party provider.

FIG. 5 and FIG. 6 illustrate block diagrams showing a technical architecture of the merchant electronic device 200 and customer mobile device 300, respectively. Specifically, the merchant electronic device 200 may be a mobile device similar to the customer mobile device 300 and with similar technical architecture.

The technical architecture includes a processor 202/302 (which may be referred to as a central processor unit or CPU) that is in communication with memory devices including secondary storage 204/304 (such as disk drives or memory cards), read only memory (ROM) 206/306, and random access memory (RAM) 208/308. The processor 202/302 may be implemented as one or more CPU chips. The technical architecture further includes input/output (I/O) devices 210/310, and network connectivity devices 212/312.

The I/O devices 210/310 include a user interface (UI) 214/314 and may include a camera 216/316. The UI 214/314 may include a touch screen, keyboard, keypad, or other known input devices. The technical architecture may further include a geolocation module 218/318 operable to determine the geolocation of the device 200/300 using signals from, for example, global positioning system (GPS) satellites.

The secondary storage 204/304 typically includes a memory card or other storage device and is used for non-volatile storage of data and as an over-flow data storage device if RAM 208/308 is not large enough to hold all working data. Secondary storage 204/304 may be used to store programs which are loaded into RAM 208/308 when such programs are selected for execution.

The secondary storage 204/304 has a processing component 220/320, including non-transitory instructions operative by the processor 202/302 to perform various operations of the method 20 according to various embodiments of the present disclosure. The ROM 206/306 is used to store instructions and perhaps data which are read during program execution. The secondary storage 204/304, the ROM 206/306, and/or the RAM 208/308 may be referred to in some contexts as computer-readable storage media and/or non-transitory computer-readable media. Non-transitory computer-readable media include all computer-readable media, with the sole exception being a transitory propagating signal per se.

The network connectivity devices 212/312 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 212/312 may enable the processor 202/302 to communicate with communication networks, e.g. the communication network 400, including the internet or one or more intranets. With such a network connection, it is contemplated that the processor 202/302 might receive information from the network, or might output information to the network in the course of performing the operations or steps of the method 20. Such information, which is often represented as a sequence of instructions to be executed using processor 202/302, may be received from and outputted to the network, for example, in the form of a computer data signal embodied in a carrier wave.

The processor 202/302 executes instructions, codes, computer programs, scripts which it accesses from hard disk, floppy disk, optical disk (these various disk based systems may all be considered secondary storage 204/304), flash drive, ROM 206/306, RAM 208/308, or the network connectivity devices 212/312. While only one processor 202/302 is shown, multiple processors may be present. Thus, while instructions may be discussed as executed by a processor 202, the instructions may be executed simultaneously, serially, or otherwise executed by one or multiple processors 202/302.

It is understood that by programming and/or loading executable instructions onto the technical architecture of the host server 100, merchant electronic device 200, and/or customer mobile device 300, at least one of the CPU 102/202/302, the ROM 106/206/306, and the RAM 108/208/308 are changed, transforming the technical architecture in part into a specific purpose machine or apparatus having the functionality as taught by various embodiments of the present disclosure. It is fundamental to the electrical engineering and software engineering arts that functionality that can be implemented by loading executable software into a computer can be converted to a hardware implementation by well-known design rules.

In the foregoing detailed description, embodiments of the present disclosure in relation to a method and system for facilitating a cashless transaction between a merchant and a customer are described with reference to the provided figures. The description of the various embodiments herein is not intended to call out or be limited only to specific or particular representations of the present disclosure, but merely to illustrate non-limiting examples of the present disclosure. The present disclosure serves to address at least some of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

What is claimed is:

1. A computerized method implemented on a host server for facilitating a cashless transaction between a merchant and a customer, the host server comprising a processor in communication with a merchant database, the method comprising:
    registering the merchant with the host server, including creating a merchant profile for the merchant using merchant information received from the merchant, the merchant information including at least a merchant phone number associated with a merchant electronic device and details of a merchant financial account;
    storing the merchant profile within the merchant database;
    receiving, at a dedicated recipient number associated with the host server from the merchant electronic device via a mobile communication protocol, a transaction message comprising merchant identification data, customer identification data, and data on a transaction cost of the cashless transaction, the merchant electronic device being a mobile device at a physical location where the cashless transaction takes place;
    determining, from the merchant database using the merchant identification data, whether the merchant is registered with the host server;
    in response to determining that the merchant is registered, retrieving, from the merchant database, the merchant profile of the merchant identified by the merchant identification data;
    determining that the transaction message includes information in an acceptable format by the host server;
    generating, based on data included in the transaction message, an address link pointing to an online payment interface, the address link and the online payment interface being unique for each cashless transaction;
    communicating, using the customer identification data, a payment message to a customer mobile device of the customer, the customer mobile device identified by the customer identification data, and the payment message comprising the address link to the online payment interface;
    in response to the customer mobile device accessing the online payment interface via the address link, auto-populating, using the data included in the transaction message, a plurality of non-editable fields included in the online payment interface;
    enabling, in the online payment interface, viewing of the data in the plurality of non-editable fields and disabling, in the online payment interface, editing of the data included in the plurality of non-editable fields;
    receiving, from the online payment interface accessible by the customer mobile device via the address link, authorization of the cashless transaction by the customer and details of a customer payment vehicle; and
    transferring the transaction cost from the customer payment vehicle to the merchant financial account.

2. The method according to claim 1, further comprising communicating a confirmation message to the merchant electronic device in response to completion of transfer of the transaction cost.

3. The method according to claim 1, further comprising communicating a return receipt message to the merchant electronic device subsequent to the host server receiving the transaction message from the merchant electronic device.

4. The method according to claim 1, wherein the merchant electronic device is a mobile device.

5. The method according to claim 4, wherein the merchant identification data comprises a phone number of the merchant electronic device.

6. The method according to claim 1, wherein the customer identification data comprises at least one of a phone number of the customer mobile device and an email address of the customer.

7. The method according to claim 1, further comprising auto-populating the online payment interface using merchant financial account details in response to the customer mobile device accessing the online payment interface.

8. The method according to claim 1, wherein the customer payment vehicle details are inputted by the customer on the online payment interface via the customer mobile device.

9. The method according to claim 1, wherein the customer payment vehicle details are retrieved from a customer user account stored on a customer database and auto-populated on the online payment interface.

10. The method according to claim 9, further comprising receiving, subsequent to communicating the address link to the customer mobile device, customer login details for retrieving the customer payment vehicle details from the customer user account.

11. The method according to claim 10, further comprising performing a customer registration process for the customer to create the customer user account.

12. A system for facilitating a cashless transaction between a merchant and a customer, the system comprising a host server comprising a processor and a memory configured to store computer-readable instructions, wherein when the instructions are executed, the processor performs steps comprising:
registering the merchant with the host server, including creating a merchant profile for the merchant using merchant information received from the merchant, the merchant information including at least a merchant phone number associated with a merchant electronic device and details of a merchant financial account;
storing the merchant profile within a merchant database in communication with the processor;
receiving, at a dedicated recipient number associated with the host server from the merchant electronic device via a mobile communication protocol, a transaction message comprising merchant identification data, customer identification data, and data on a transaction cost of the cashless transaction, the merchant electronic device being a mobile device at a physical location where the cashless transaction takes place;
determining, from the merchant database using the merchant identification data, whether the merchant is registered with the host server;
in response to determining that the merchant is registered, retrieving, from the merchant database, the merchant profile of the merchant identified by the merchant identification data;
determining that the transaction message includes information in an acceptable format by the host server;
generating, based on data included in the transaction message, an address link pointing to an online payment interface, the address link and the online payment interface being unique for each cashless transaction;
communicating, using the customer identification data, a payment message to a customer mobile device of the customer, the customer mobile device identified by the customer identification data, and the payment message comprising the address link to the online payment interface;
in response to the customer mobile device accessing the online payment interface via the address link, auto-populating, using the data included in the transaction message, a plurality of non-editable fields included in the online payment interface;
enabling, in the online payment interface, viewing of the data in the plurality of non-editable fields and disabling, in the online payment interface, editing of the data included in the plurality of non-editable fields;
receiving, from the online payment interface accessible by the customer mobile device via the address link, authorization of the cashless transaction by the customer and details of a customer payment vehicle; and
transferring the transaction cost from the customer payment vehicle to the merchant financial account.

13. The system according to claim 12, wherein the steps further comprise communicating a confirmation message to the merchant electronic device in response to completion of transfer of the transaction cost.

14. The system according to claim 12, wherein the steps further comprise communicating a return receipt message to the merchant electronic device subsequent to the host server receiving the transaction message from the merchant electronic device.

15. The system according to claim 12, wherein the merchant electronic device is a mobile device.

16. The system according to claim 15, wherein the merchant identification data comprises a phone number of the merchant electronic device.

17. The system according to claim 12, wherein the steps further comprise auto-populating the online payment interface using merchant financial account details in response to the customer mobile device accessing the online payment interface.

18. A non-transitory computer-readable medium storing computer-readable instructions that, when executed, cause a processor to perform steps of a method for facilitating a cashless transaction between a merchant and a customer, the steps comprising:
registering the merchant with a host server, including creating a merchant profile for the merchant using merchant information received from the merchant, the merchant information including at least a merchant phone number associated with a merchant electronic device and details of a merchant financial account;
storing the merchant profile within a merchant database;
receiving, at a dedicated recipient number associated with the host server from the merchant electronic device via a mobile communication protocol, a transaction message comprising merchant identification data, customer identification data, and data on a transaction cost of the cashless transaction, the merchant electronic device being a mobile device at a physical location where the cashless transaction takes place;
determining, from the merchant database using the merchant identification data, whether the merchant is registered with the host server;
in response to determining that the merchant is registered, retrieving, from the merchant database, the merchant profile of the merchant identified by the merchant identification data;
determining that the transaction message includes information in an acceptable format by the host server;

generating, based on data included in the transaction message, an address link pointing to an online payment interface, the address link and the online payment interface being unique for each cashless transaction;

communicating, using the customer identification data, a payment message to a customer mobile device of the customer, the customer mobile device identified by the customer identification data, the payment message comprising the address link to the online payment interface;

in response to the customer mobile device accessing the online payment interface via the address link, auto-populating, using the data included in the transaction message, a plurality of non-editable fields included in the online payment interface;

enabling, in the online payment interface, viewing of the data in the plurality of non-editable fields and disabling, in the online payment interface, editing of the data included in the plurality of non-editable fields;

receiving, from the online payment interface accessible by the customer mobile device via the address link, authorization of the cashless transaction by the customer and details of a customer payment vehicle; and transferring the transaction cost from the customer payment vehicle to the merchant financial account.

19. The method according to claim 1, wherein the mobile communication protocol includes a short message service (SMS).

20. The method according to claim 19, wherein the dedicated recipient number represents a registered mobile system for use in conjunction with the mobile communication protocol, and wherein the dedicated recipient number includes at least one of a phone number, a representative number for receiving internet-based messaging, and an SMS short code.

* * * * *